Dec. 15, 1970  A. M. TIMPÉ  3,546,884
SUBTERRANEAN IRRIGATION
Filed Sept. 6, 1968  2 Sheets-Sheet 1
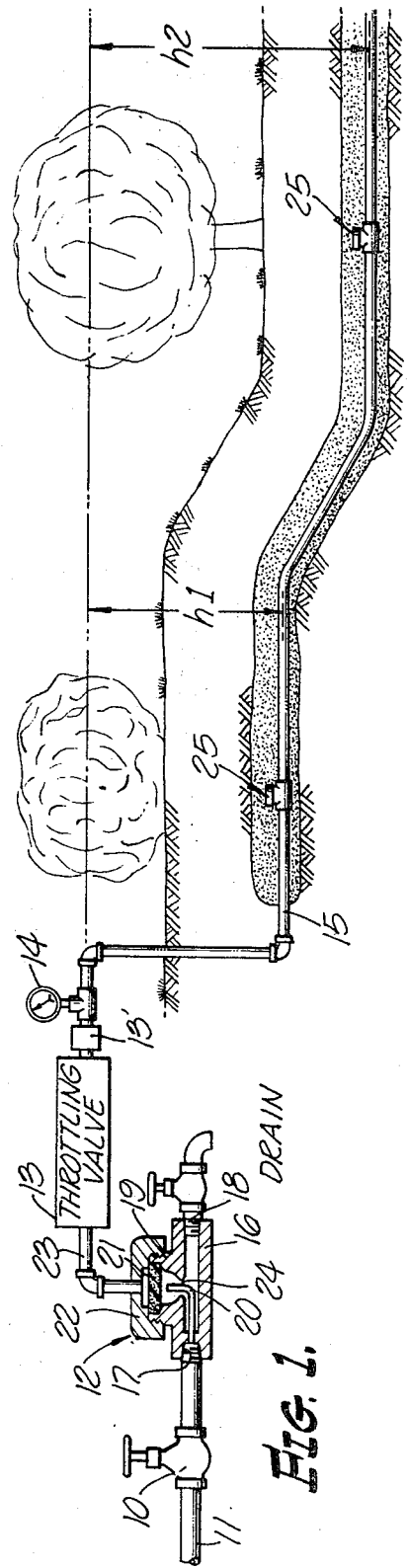
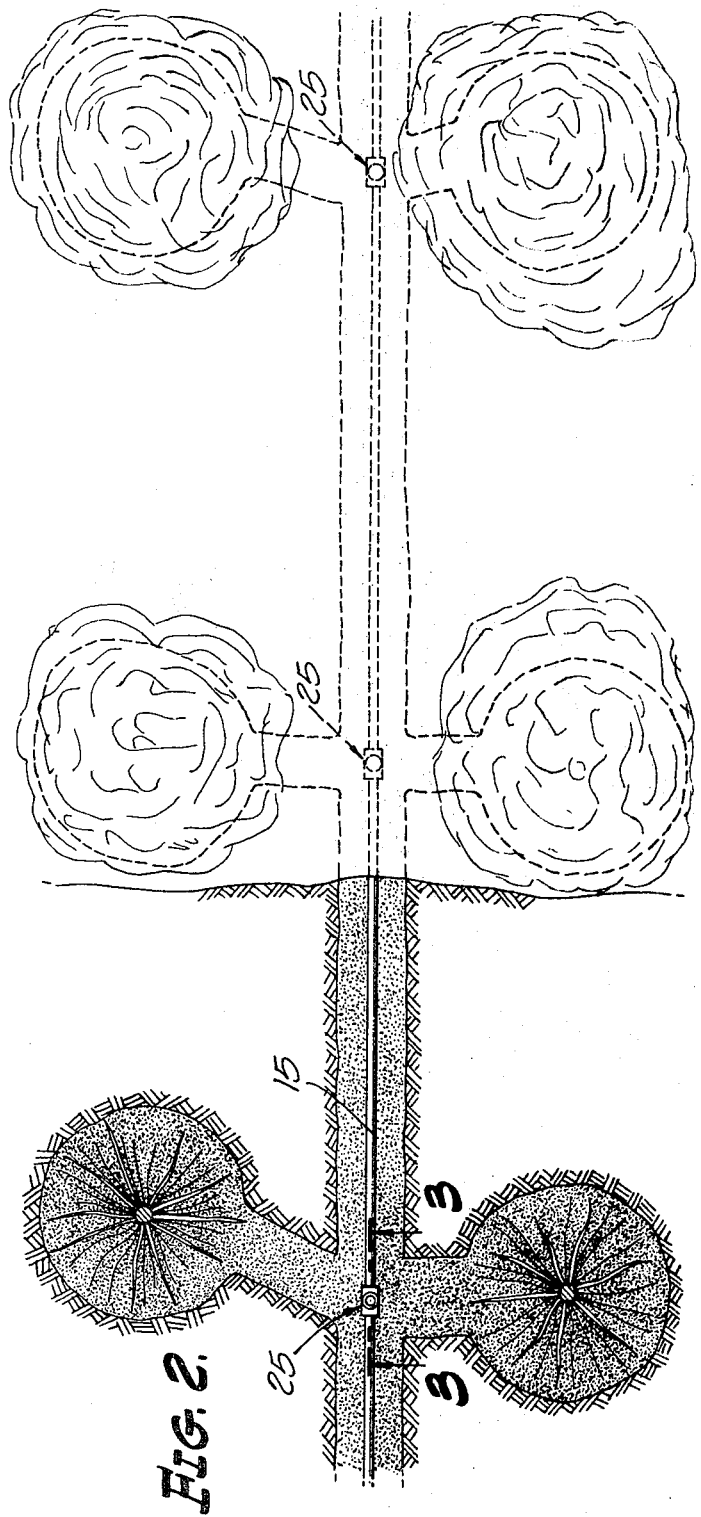
INVENTOR
ATWOOD M. TIMPÉ
BY KENDRICK and SUBKOW
George J. Netter
ATTORNEYS

United States Patent Office 3,546,884
Patented Dec. 15, 1970

3,546,884
SUBTERRANEAN IRRIGATION
Atwood M. Timpe, 430 S. Burnside Ave., Apt. 9B,
Los Angeles, Calif. 90036
Filed Sept. 6, 1968, Ser. No. 758,039
Int. Cl. E02b *13/00;* B05b *1/30*
U.S. Cl. 61—13                                    13 Claims

ABSTRACT OF THE DISCLOSURE

The requisite number of water release applicators are located at predetermined locations underground, which applicators release water in specific measured quantities. Connecting areas between applicators may be sand-filled channels ("wicks") which speeds water movement to the surrounding soil. The applicators, or precipitators, provide a constant rate of water application for a given water source pressure, irrespective of hydrostatic head differentials that may exist at the different applicators by virtue of their being located at different heights relative to the water source. Each applicator includes an automatic constant metering device, within the range of the expected hydrostatic head variation, that is pressure operated to control water efflux rate.

---

The present invention pertains generally to a subterranean irrigation system, and, more particularly, to such a system for providing continuous and relatively constant low-rate application of water beneath the surface of the ground at a plurality of different locations.

BACKGROUND OF THE INVENTION

A desirable and highly efficient way of irrigating soil is to introduce the water beneath the surface at the desired locations, and in specific amounts. In this way, water use efficiency is enhanced since evaporation and run-off are eliminated.

In my Pat. 3,046,747, entitled Subterranean Irrigation, dated July 31, 1962, an underground irrigation system is described. This patent describes a system including water release applicators, or precipitators, which accurately control flow of water into surrounding soil, in specific amounts so as to continuously replace the film water at substantially the same rate it is consumed by the plant life. The precipitators have foamed plastic means releasing the water via cellulose structures into the soil at the prescribed constant seepage rate. With the precipitators described in that patent, water dispensation can be provided selectively in the range of about 1 to 10 cc./minute, with an accuracy of about 1 to 2 cubic centimeters.

Although the system and water release devices used in the system described in my patent are fully satisfactory for many applications, particularly where the soil surface to be irrigated does not vary in height to any great extent; however, if this is not true and there is substantial variation of height of the different locations to be watered, there is the problem that the hydrostatic head variations from the different locations provide a variation in pressure even though the line pressure at the source is maintained at a substantially constant value. The water release devices of the patent operate entirely upon water pressure and therefore increased rates of water release are achieved at those locations having a greater total water pressure. In order to accommodate for such head variations and still provide a constant water supply rate to the soil, the patented water release devices would have to be specially made for each underground height which would be prohibitively expensive.

It is, therefore, a primary object and aim of the present invention to provide a water release system and applicator for use therein which provides substantially constant efflux rates of water despite changes in elevational disposition of the applicators.

A further object of this invention is the provision of a precipitator for use in subterranean irrigation which includes metering elements readily interchangeable for accommodating local relatively large pressure changes.

A still further object of the invention is the provision of a precipitator or water release applicator as described in the above objects that is relatively immune from clogging or obstruction of the metering means by either organic or inorganic materials carried by the water.

Yet another object of the invention is the provision of a constant metering rate precipitator that is relatively unaffected by chemicals in the form of fertilizers, and the like, or oxidation, or electrolytic action which normally takes place beneath the surface of the soil due to interaction between the irrigation system and the soil in which the system is located.

Another object is to provide a subterranean irrigation system and precipitator that can be cleaned by water flushing techniques.

A still further object is the provision of a constant metering precipitator for use in a subterranean irrigation system as set forth in the above objects which can continuously discharge a metered amount of water and is not clogged by plant roots.

Other objects and advantages of the invention will be apparent to those skilled in the art on reference to the following description when considered in the light of the accompanying drawings.

SUMMARY OF THE INVENTION

A system of pipes for carrying water is arranged in a predetermined pattern below the ground surface and terminates at a plurality of different locations in precipitators or water release applicators of special construction for providing constant metered water seepage to the surrounding soil. Channels, troughs, or a thin layer of sandy soil or other quick water absorbing material, is provided surrounding the water transmission conduits and precipitator are thoroughly wet by controlled rate seepage from the precipitators and act as wicks to quickly move water to the surrounding ground. One form of precipitator includes a plurality of disks arranged in facing relation, each disk having a number of tapered openings and via which water under line pressure can seep into the surrounding soil while simultaneously serving to keep roots from invading the precipitator interior. A further aspect is the provision of a translatable orificed metering plate in the precipitators which upon increased water pressure is moved against a valve member to cover certain of the openings, thereby lowering the water release rate to compensate for pressure head increase.

DESCRIPTION OF THE DRAWINGS

FIG. 1 is a diagrammatic illustration of the system of the present invention.

FIG. 2 is an enlarged plan view of an underground irrigation system of this invention.

DESCRIPTION OF A PREFERRED EMBODIMENT

Figure 3:
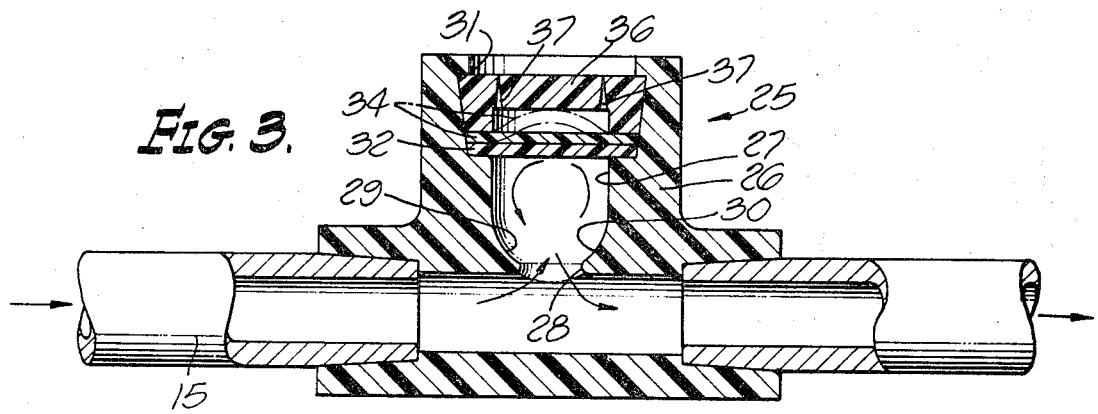
FIG. 3 is a sectional view of one form of water release precipitator for use in the system of the invention.

It is fundamental to a full appreciation and understanding of my invention to be aware that for optimum watering of plant sustaining soil, the water rate must be kept at a value to maintain soil particles in the region of plant roots surrounded by a water film. However, if water is applied at too great a rate so as to saturate the soil, i.e., to exceed so-called filed capacity, this is detrimental to plant growth. Accordingly, controlled rate of water application is vital to the system of my invention, which rate, although varying somewhat for different kinds of soil, has been found to lie in the range of 1–10 cc./minute.

With reference now to FIGS. 1 and 2, there is shown a subterranean irrigation system comprising a main valve 10 connected in a supply line 11 from a suitable source of water supply (not shown). A filter 12, throttling valve 13, flow rate meter 13', and pressure gage 14 are serially interconnected in the water distribution line 15 downstream of the main valve, and by which means the grosser foreign materials that might clog the system are removed from the water and water source pressure can be both monitored and regulated.

More particularly, the filter 12 includes a generally T-shaped body 16 having an inlet 17 and drain outlet 18 with a pocket chamber 19. Incoming pressurized water is emptied directly into the chamber 19 via a conduit 20. A filter pad 21 of foamed plastic, for example, is compressively retained over the upper open end of the chamber 19 by a cap 22 threaded onto the body walls 16 defining the chamber. Outlet of filtered water to the throttling valve is provided by line 23. In operation, water from the conduit produces a slight swirling motion in the chamber 19 which promotes movement of foreign matter, organic and inorganic, through the restricted orifice 24 to the drain. Collected sediment can be flushed out when needed by merely opening the drain for a short period of time.

The distribution line 15 on leaving the gage 14 passes underground to deliver water to a plurality of different water release devices or precipitators 25 shown for illustrative purposes as located at different vertical heights, $h1$, $h2$, etc., relative to the supply line 11. Accordingly, the actual water pressure at the different water release devices will vary, depending upon the magnitude of the hydrostatic head at each device by virtue of its vertical position. Since, as has already been noted, it is important that each precipitator distribute water at a predetermined constant rate, and since the vertical location of any device can expect to vary a number of feet depending upon the terrain topography, satisfactory precipitators must be able to accommodate relatively small pressure changes occasioned by their location at different heights and still provide the required water output within an acceptable tolerance range. It is, of course, clear that custom release devices could be provided for each location, i.e., designed specifically to release water at the required rate for a particular depth location; however, this could be very expensive and time consuming in irrigation systems covering a number of acres with a corresponding large number of water precipitators. All plant life requires a certain quantity of water throughout the growing season, and if water is to be released intermittently during this time, large quantities at any one time are demanded, which necessarily calls for larger piping at greater expense. The system described herein operates continually throughout the growing season permitting coverage of large areas with small tubing, which, in turn, makes this system very economical.

Figure 5A:
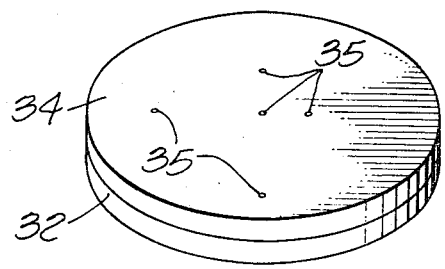
FIGS. 5*a* and 5*b* depict enlarged perspective and sectional views, respectively, metering plates for use in the precipitators of FIGS. 2 and 4.
Figure 5B:
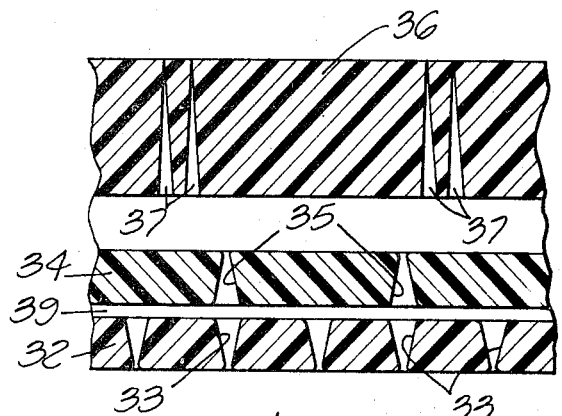

As a first embodiment of water release precipitators for use in the system of my invention, reference is made particularly to FIGS. 3, 5a and 5b. The precipitator 25 comprises a generally hollow cylindrical body 26, sealingly received onto the distribution line 15 such that the internal bore 27 communicates between the soil and the distribution line interior. More particularly, the bore 27 has a substantially constant circular cross-section extending from the soil side and terminates at the distribution line end in an orifice 28 formed by the sharply sloping walls 29 and 30. An annular groove 31 is formed on the inner wall surface of the body 26 adjacent the soil end thereof for receiving and retaining a metering assembly.

The metering assembly is constructed of three foraminous disks of special construction tightly sandwiched together such that water can make its way through the various foramina to the adjacent soil at the desired rate. The lowermost disk 32, FIGS. 5a and 5b, includes a relatively large number of tapered passages 33, with the disk side having the smaller openings facing downwardly toward the distribution line 15. The middle disk 34 is thinner than disk 32 and includes a plurality of passages 35 tapered in a direction opposite that of passages 33, i.e., the smaller openings upward. The outermost or uppermost disk 36 is tapered as shown and has a body thickness greater than that of disk 32 and includes approximately one-half the number of tapered passages 37 as disk 32 with the taper in the same direction as passages 35. Looking down on top-side of 36, the passages 37 are located on a circular path adjacent the outer margin of the disk and in an actual construction there were thirty such openings.

As indicated, it is important that the lowermost disk 32 have a relatively large number of passages or metering orifices as compared to those of either disks 34 or 36. For example, in actual constructions, the disks 32 contained from 50–100 openings as compared to five (5) openings in disk 34. The purpose of the large number of passages 33 in disk 32 is to reduce the possibility of suctional drag of water going through such passages from entraining foreign material that could clog the passages. For example, each passage in disk 34 releases approximately 10 drops per minute per passage whereas each passage in 32 releases approximately one drop every two minutes. In other words, this construction acts as a reverse filter holding all organic particles in suspension under 32 and in pocket region 27, requiring flushing only about once a year.

It is also important to note that the smaller opening of all the passages is measured in the ten-thousandths of an inch diameter range. Also, the materials used in construcing various disks has an elasticity similar to cork so that when the fluid pressure is turned off the tapered passages close and again open when subjected to fluid pressure. Further on this same point of reducing the possibility of clogging the disk passages, the sloping walls 29 and 30 create a certain degree of turbulence which tends to prevent deposition of foreign materials on the lower surface of disk 32.

As a result of the turbulence inducing construction of the sloping walls 29 and 30 of the orifice 28, along with the very low rate of water release, any foreign material that may not be removed by the special filter 12 will settle on the lower inner wall surface of the distribution line 15. If necessary opening the remote end of the system and flushing with pressurized water will clean out any such sediment in the line that may accumulate.

If the precipitator of FIG. 3 is subjected to an increase in water pressure as for example due to hydrostatic head variation through height, the disk 34 is distended arcuately as shown by the dashed line. Bowing of the disk 34 brings its center region into contact with the upper disk covering certain of the orifices 35. Accordingly, although the increased water pressure tends to pass more water through each orifice 35, since fewer such orifices are now available to pass water, the overall seepage output of the precipitator remains substantially constant.

Figure 4:
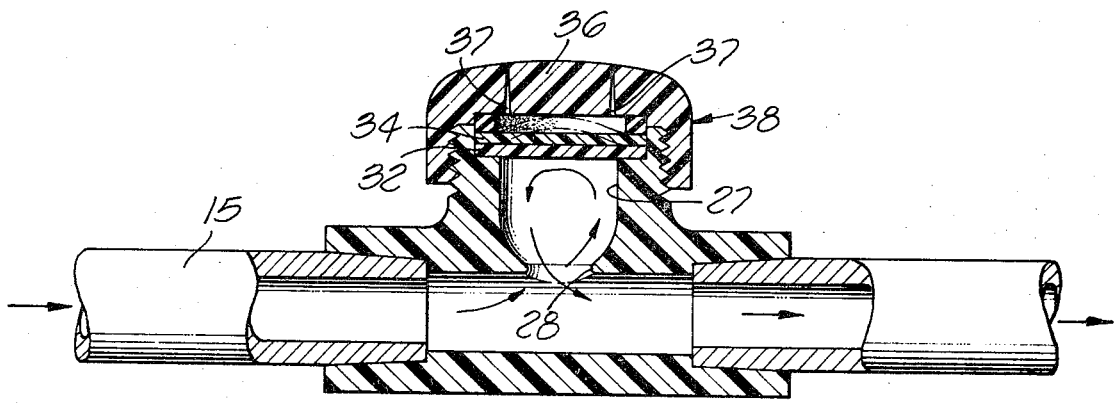
FIG. 4 is a sectional view of a further form of water release precipitator.

The embodiment of FIG. 4 is substantially identical to that of FIG. 3 differing primarily in providing a removable cap 38 that is threaded onto the main precipitator body, and which cap includes the upper disk 36 unitary therewith. Operation is identical to the first described precipitator.

As a further aspect of the invention, an individual aperture plate 34 can be quickly and easily modified to provide a different metering rate. For example, if a given aperture plate is provided for, say, a release rate of 5 cc./minute, additional openings may be easily provided in the central portions thereof to increase its flow rate to, say, 7 to 8 cc./minute, as desired. Operation of the device will otherwise be unchanged and closure of select openings of the aperture plate will still reduce fluid flow and substantially linearly with respect to the total amount of fluid being provided adjacent soil.

It can be shown with the precipitator constructions of FIGS. 3 and 4 operating on a line pressure of approximately 5 pounds per square inch that the water from the openings 33 passing into the space 39 between plates 32 and 34 is set into turbulence before passing on through openings 35.

In the practice of the present invention there is provided a system for supplying water to soil via underground dispensers at a controlled low rate such that the available water for plant roots being cultivated is maintained at substantially the field capacity. The precipitators of the system are so constructed that any foreign materials which may be in the water being released to the soil will not clog the metering orifices. Variations in hydrostatic head arising by virtue of location of the different water release precipitators at differing heights is automatically compensated for in order to insure constant predetermined water release rate. Opening one end of the distribution line permits ready flushing of the entire system and removal of sediment and foreign particles which may or may not collect in the system.

The aforedescribed underground irrigation system can also be utilized in other advantageous respects. For example, by the same system soluble plant nutrients can be added to soil and thus to the plants. Moreover, the water source can be disconnected and a relatively low pressurized source of air connected to the system for aerating the soil.

Particularly as a result of providing a relatively large number of passages 33 in the disk 32 as compared to the relatively few openings in disk 34, the suctional drag through passages 33 is exceptionally small, thereby insuring against the clogging of the passages by entrained foreign matter. Reliability of operation and long lived performance are considerably enhanced by preventing clogging of the precipitators disks in this manner. It is clear that if a precipitator becomes clogged (and thus inoperative), it is necessary to dig up the defective precipitator and either repair or replace it which can be quite time consuming as well as expensive.

Although other configurations for the openings 35 in disk 34 may be satisfactory, that shown in FIG. 5(a) has been found particularly advantageous in practice. More particularly, a central opening is provided with the other openings located at different radial angles and different radial distances from the central opening. In this manner, distention of the disk 34 by increased water pressure closes first the central opening and then, successively, those openings of next greatest distance from the central opening.

Although only two specific embodiments of the present invention have been described and illustrated herein, many changes and modifications will, of course, suggest themselves to those skilled in the art. These embodiments have been selected for this disclosure for the purpose of illustration only. The present invention should, therefore, not be limited to the embodiments so selected, the true scope of the invention being defined only in the appended claims.

What is claimed is:
1. A subterranean irrigation system, comprising:
   a water feed line located underground and connected to a source of substantially constant presure water;
   a plurality of water dispensers connected to the feed line and disposed at locations underground adjacent plant roots to receive water, said dispensers seeping water in droplets in the range of 1–10 cubic centimeters per minute; and
   a quantity of relatively rapid water absorbing material interconnecting the water dispensers and associated plant roots.

2. A subterranean irrigation system as in claim 1, in which the rapid water absorbing material is sandy soil.

3. A subterranean irrigation system as in claim 1, in which the dispensers provide water to the soil adjacent the plant roots at a rate approximately equal to the field capacity of said soil.

4. A subterranean irrigation system as in claim 1, in which the source provides feed water at a pressure of approximately 5 pounds per square inch.

5. In a self-regulating subterranean irrigation system having a plurality of water dispensers located underground, the improvement comprising each dispenser including foraminous plate means via which water is passed to the surrounding soil, said plate means being translatable by supply water pressure exceeding a certain predetermined magnitude to contact a control means covering certain of the foramina and preventing water passage therethrough and said plate means returning to its original position upon reduction of the water pressure to said predetermined magnitude whereby substantially constant water output the surrounding soil is obtained over a range of source water pressure.

6. In a subterranean irrigation system as in claim 5, in which the control means includes a plate maintained in parallel face opposed relation to the translatable plate means, said control means including a plurality of openings arranged about a centrally located imperforate region which is brought into contact and covering relation to certain foramina of the foraminous plate means on increase of source water pressure.

7. In a subterranean irrigation system as in claim 6, in which there is further provided a perforated plate disposed in slightly spaced opposed relation to the foraminous plate means and on the upstream side thereof.

8. A water precipitator for use in a subterranean irrigation system, comprising:
   a hollow tubular body connected to a source of pressurized water;
   a first plate received within the cavity of the tubular body and having a plurality of openings for passing water therethrough;
   a second perforated plate disposed in the cavity of the tubular body for receivnig and passing water from said first plate; and
   a third perforated plate in said cavity for receiving water passing through the second plate and emitting said water to the surrounding soil in a continuous manner, the openings in each of said plates being tapered.

9. A precipitator as in claim 8, in which the first plate includes a certain number of openings and said second plate includes a lesser number of openings in at least a ratio of 1 to 2, whereby suctional drag through the openings in said first plate is practically eliminated.

10. A precipitator as in claim 8, in which the openings in the third plate are arranged in a closed generally circular path about a central imperforate region.

11. A precipitator as in claim 9, in which the first and second perforated plates are spaced from one another whereby water passing through the perforations of the first plate is set into turbulence in said space.

12. A water precipitator for use in a subterranean irrigation system, comprising:
   a hollow tubular body connected to a source of pressurized water;
   a first plate received within the cavity of the tubular body and having a plurality of openings for passing water therethrough;
   a second perforated plate disposed in the cavity of the tubular body, spaced from said first plate and on that side of the first plate for receiving water passing through said first plate, said second plate being constructed of a flexible material such that when water received from the first plate has a pressure greater than a predetermined magnitude, said second plate distends away from said first plate; and a third perforated plate in said cavity for receiving water passing through the second plate and emitting said water to the surrounding soil in a continuous manner, said third perforated plate disposed in said cavity and spaced from said second perforated plate at a distance such that when said second perforated plate is distended, portions of said second plate will contact said third plate covering certain of the openings in said second plate, whereby contacting of said second and third perforated plates controls water dispensed by the precipitator.

13. A water precipitator for use in a subterranean irrigation system, comprising:

a hollow tubular body connected to a source of pressurized water;

a first plate received within the cavity of the tubular body and having a plurality of tapered openings with the small ends thereof toward the pressurized water source for passing water therethrough;

a second perforated plate disposed in the cavity of the tubular body spaced from said first plate for receiving and passing water received from said first plate, the openings in said second plate being tapered with the large end facing the first plate; and a third perforated plate in said cavity for receiving water passing through the second plate and emitting said water to the surrounding soil in a continuous manner.

References Cited
UNITED STATES PATENTS

| | | | |
|---|---|---|---|
| 1,832,915 | 11/1931 | Plumer | 61—13 |
| 2,402,741 | 6/1946 | Draviner | 239—534 |
| 3,046,747 | 7/1962 | Timpe | 61—13 |
| 3,282,508 | 11/1966 | Roberts | 138—45X |
| 3,303,800 | 2/1967 | Young | 239—534X |

JACOB SHAPIRO, Primary Examiner

U.S. Cl. X.R.

237—534